United States Patent [19]

Bank

[11] Patent Number: 5,730,474
[45] Date of Patent: Mar. 24, 1998

[54] PIPE JOINT AND PIPE FOR USE THEREWITH

[75] Inventor: Michael D. Bank, South Euclid, Ohio

[73] Assignee: The Lamson & Sessions Co., Cleveland, Ohio

[21] Appl. No.: 627,730

[22] Filed: Apr. 2, 1996

[51] Int. Cl.[6] .................................................. F16L 17/06
[52] U.S. Cl. ........................... 285/110; 285/331; 285/423; 285/910
[58] Field of Search ................................. 285/331, 910, 285/336, 423, 110

[56] References Cited

U.S. PATENT DOCUMENTS

| 1,905,122 | 4/1933 | Baash et al. .................. 285/331 X |
| 4,819,972 | 4/1989 | Champa et al. . |

FOREIGN PATENT DOCUMENTS

| 91447 | 10/1961 | Denmark ......................... 285/331 |
| 67082 | 11/1943 | Norway ........................... 285/331 |
| 392170 | 9/1965 | Switzerland ..................... 285/331 |

*Primary Examiner*—Dave W. Arola
*Attorney, Agent, or Firm*—Jones, Day, Reavis, & Pogue

[57] ABSTRACT

A pipe joint is disclosed, along with a pipe for use with such a joint. The pipe has a double wall construction with support ribs connecting the two walls of the pipe. The pipe also includes at least one end wall having a routed groove formed therein, wherein the groove is dimensioned to receive a coupling member. A locking entrance lip is formed within the groove. The pipe joint includes two pipe sections and a coupling member that is received into the respective grooves of each pipe section and is locked into place by the locking entrance lips. The joint is fluid tight, locks the pipe sections in place, and is smooth on both the interior and exterior surfaces of the two connected pipes. In addition, the disclosed pipe joint construction is very easy to assemble, and is particularly suited for use in sewer relining operations.

12 Claims, 2 Drawing Sheets

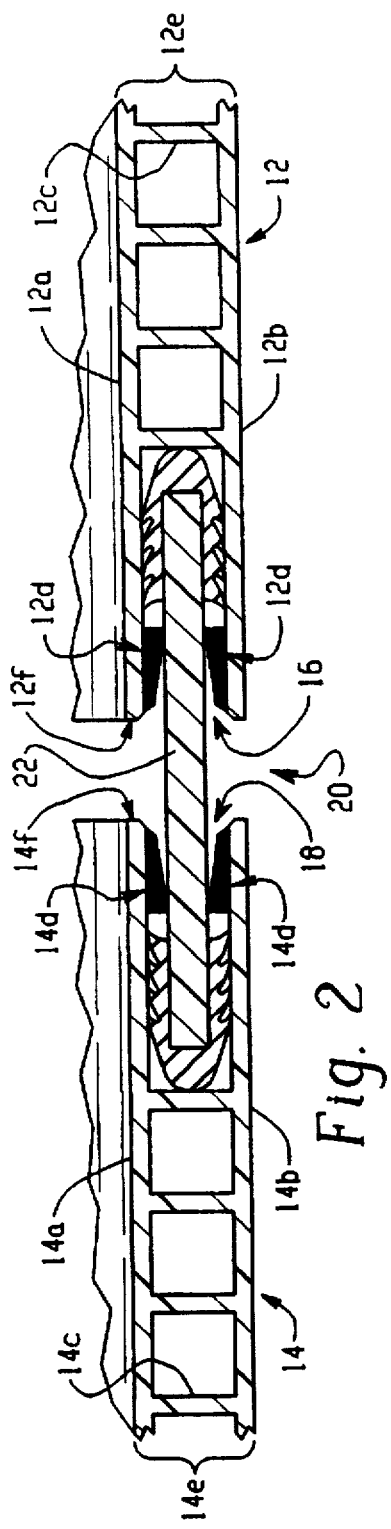
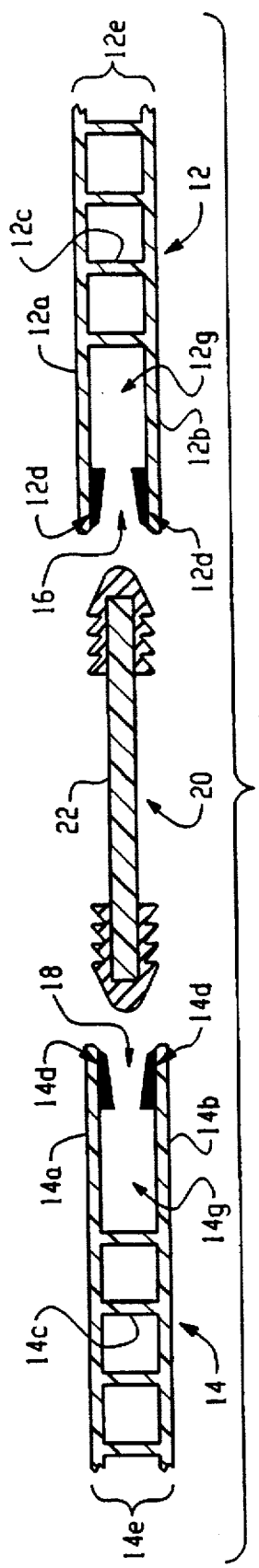
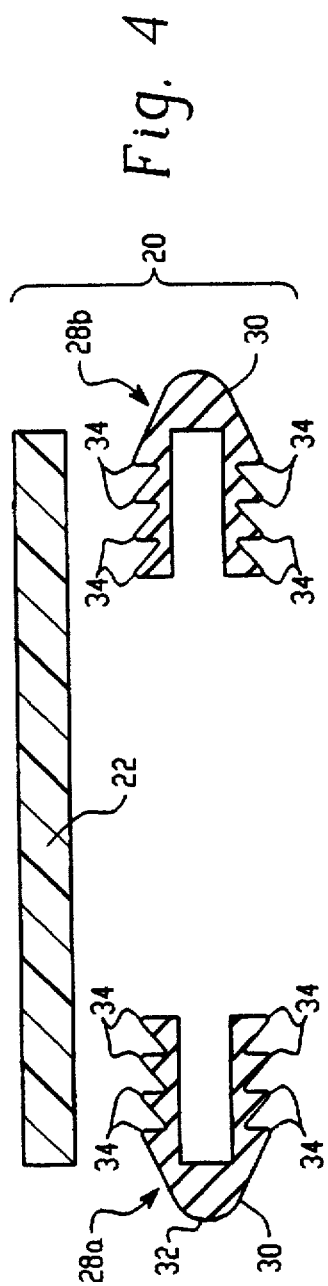
Fig. 2
Fig. 3
Fig. 4

PIPE JOINT AND PIPE FOR USE THEREWITH

BACKGROUND OF THE INVENTION

The present invention is directed toward the art of pipe joints, and more particularly to a pipe joint for a double-walled pipe that results in a smooth transition between the interior and exterior surfaces of the pipes to be joined, and which provides a locking joint, such that when the pipes are connected the possibility of separation due to either lateral or axial forces along the pipe is minimized.

The pipe, pipe joint, and method of forming the pipe, as described and claimed in the present invention, is particularly suited for use with "relining" operations. In a typical relining operation, a span of existing sewer pipe that has degraded over time is identified. Instead of excavating and replacing the entire pipe (a costly and time consuming operation), sections of plastic pipe, which have a diameter slightly less than the existing pipe, are connected together and inserted into the existing sewer line from a spaced series of access holes. Thus the sewer line is "relined" instead of being excavated and replaced.

Some of the problems encountered in relining operations are: (1) how to effectively connect two pipe sections together so that they do not separate during and after insertion into the existing sewer line; (2) how to provide a fluid-tight seal, and at the same time maintain a smooth transition between the respective outer and inner surfaces of the coupled pipes; and (3) how to provide a pipe which can be easily connected with another pipe in the confined space of the access holes.

One known pipe joining method uses pipes that have two types of end walls, a threaded insertion end wall at one end and a threaded receiving end wall at the opposite end. The pipes are interconnected by screwing the insertion end of one pipe section into the receiving end of another pipe section. The problem with this method is that it is difficult to twist large sections of pipe together, and is especially difficult to do so within the confined space of an access hole. This requires special equipment within the access hole to support the entire span of pipe during the joining operation.

Another known method includes using pipes that have a double wall construction, with a groove formed at each end of the pipe. A coupling member is then inserted into a groove at one end of a pipe to be connected, leaving one end of the coupling exposed. A groove at the end of a second pipe is then aligned with the exposed end of the coupling member and is pressed onto the exposed end. A friction fit is thus formed between the coupling member and the respective pipe grooves thereby connecting the two pipe sections. While this method solves the problem of having to screw two pipes together within the access holes, there is no mechanism for locking the two pipes together. Given sufficient axial or lateral forces on the joint, the friction fit will give way, resulting in a decoupling of the pipe sections and a breach of the new sewer line's integrity.

There remains a need for a pipe joint which includes a first and a second pipe section, each pipe section having a groove in one end wall for receiving a coupling member, and wherein the coupling member is received into each groove and locked into place, thereby forming a locked joint.

There remains a further need for such a pipe joint where the interior and exterior surfaces of the pipe joint are smooth, and where the pipe joint creates a fluid tight seal.

There remains a further need for such a pipe joint which can withstand the high axial loads associated with inserting the pipe into an existing sewer line, and which can withstand lateral loads as well.

There remains a further need for such a pipe joint which is easy to assemble in confined spaces, and which is economical to produce.

There remains a further need for a pipe which is particularly suited for use in creating such a pipe joint, such a pipe having double walled construction and a mechanism for locking the pipe to a coupling member.

SUMMARY OF THE INVENTION

The present invention provides a pipe joint that satisfies the needs noted above. In particular, the invention comprises a pipe that can be readily connected to other pipes of similar construction, and a coupling member or ring for connecting the pipe sections. The pipe is defined by a cylindrical retaining wall with two end walls. The retaining wall of the pipe is comprised of two walls, an inner wall which contains material travelling though the pipe, and an outer wall which contacts the environment surrounding the pipe. A plurality of support ribs join the two walls together, the support ribs extending around the circumference of the pipe in order to provide strength and rigidity.

A groove is routed into the end walls of the pipe between the inner wall and the outer wall. The groove has an open end and three sides. One side of the groove is formed by the inner wall, one side is formed by the outer wall, and a third side is defined by one of the plurality of support ribs. The opening of the groove is dimensioned to receive the coupling member. A locking entrance lip is formed in the groove and the locking lip interacts with the coupling member, after the coupling member is received into the groove, in order to retain the coupling member within the groove.

The pipe joint of the present invention includes two of the pipes described above and a coupling member. The coupling member preferably includes a rigid cylindrical core ring, which is preferably formed of a fiber-reinforced plastic material. The coupling member has two ends so that two pipe sections can be joined with a single coupling member. Each end of the core ring is covered with a resilient compressible cover, preferably made of a rubber material. Each cover extends around one end of the core ring and includes a number of flexible protrusions on both sides of the assembled coupling member. These protrusions serve two purposes. First, they provide a sealing surface against the interior of the groove in order to prevent material from leaking out from the pipe joint, and second, they are mechanically retained by the locking entrance lip of the groove in order to form a locked joint.

To form the present pipe joint, one end of the coupling member is received in the groove of the first pipe section as described above, such that the flexible protrusions extend into the groove beyond the locking entrance lip. This forms a locked joint between the first pipe section and the coupling member (as used herein, the term locked joint refers to a joint including a structure that mechanically retains a coupling member). An end wall of the second pipe section is then brought into alignment with the end of the coupling member extending outward from the groove of the first pipe (i.e. the exposed section of the coupling member). The second pipe section is then mounted onto the coupling member such that the protrusions on the coupling member are received in the groove of the second pipe section beyond its locking entrance lip. This forms a locked joint between the coupling member and the second pipe section. In this manner, a sealed, locked joint is formed between the two pipe sections.

When used in a sewer relining operation, alternating sections of pipe and coupling members are locked together as described above to form a span of connected pipe sections which comprise the new sewer line, and which include a plurality of pipe joints according to the present invention.

The afore-described pipe joint is both fluid tight, due to the compression of the protrusions against the first side and the second side of the groove in the pipe section end walls, and is smooth between both the interior and exterior walls of the retaining wall of each pipe section. This is particularly desirable in relining operations because there is no structure protruding from the retaining walls to prevent the movement of the pipe sections as they are inserted into, and pushed through, the existing sewer line. In addition, the absence of any structure protruding into the cavity of the joined pipe sections assures smooth fluid flow within the new sewer pipe

BRIEF DESCRIPTION OF THE DRAWINGS

The above advantages will become apparent from the following description when read in conjunction with the accompanying drawings wherein:

FIG. 2 is an enlarged view of the circled area of FIG. 1;

FIG. 3 is an exploded view of the joint shown in FIG. 2; and,

FIG. 4 is a cross-sectional view of the individual components of the coupling member used in the joint shown in FIGS. 1-3.

DETAILED DESCRIPTION OF A PREFERRED EMBODIMENT

Figure 1:
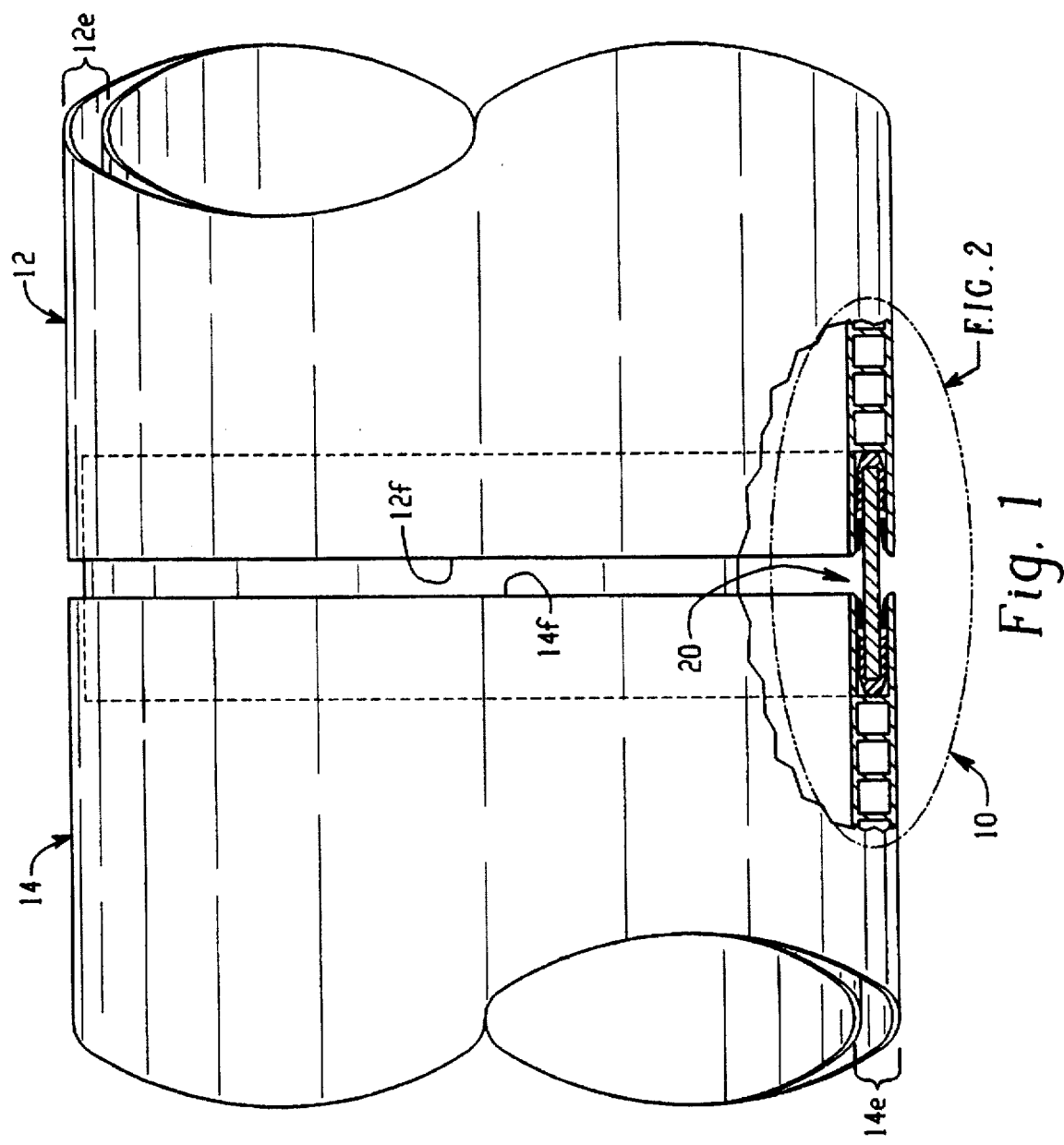
FIG. 1 is a partial side elevational view of two pipe sections formed pursuant to the present invention, including a partial sectional view of a locking joint structure in accordance with the present invention.

Referring now to the drawings, FIG. 1 shows two pipe sections 12, 14 according to the present invention, and the locking pipe joint that is formed by connecting the two pipe sections to the coupling member 20.

Pipe sections 12, 14 are formed by extruding a rectangular section of double-walled plastic, wherein the walls are connected by support ribs. The rectangular section is extruded onto a mandrel (not shown), and the extruded plastic is helically formed about the mandrel to create a cylindrical pipe in a fashion known to those skilled in the art. To form individual pipe sections, a straight cut, i.e., a cut made perpendicular to the axis of the cylinder, is made. The preferred pipe sections, therefore, are in the shape of a right cylinder. The resulting pipe sections 12 and 14 are respectively defined by retaining walls 12e, 14e. Retaining walls 12e, 14e are respectively comprised of inner walls 12a, 14a, and outer walls 12b, 14b, where the respective inner walls and outer walls are connected by a plurality of transverse support ribs 12c, 14c. Cylindrical pipe sections 12, 14 also include end walls 12f, 14f, respectively.

End walls 12f, 14f are routed by plunging a routing bit between the respective inner walls 12a, 14a, and outer walls 12b, 14b, to a predetermined depth. During the routing operation, the routing machine is held in a constant position, and the pipe section is rotated. The routing bit has a notch formed in its shaft, the position of the notch corresponding to the position on the respective inner walls 12a, 14a, and outer walls 12b, 14b, where the locking entrance lip 12d, 14d is to be formed. As the pipe section is rotated, and each end wall groove is thereby routed, the notch in the routing bit leaves behind a portion of material that forms the locking entrance lip 12d, 14d. The lip extends at least partially about the circumference of the groove.

FIGS. 2 and 3 show the joint construction in assembled and disassembled form. The grooves 16, 18 are formed by removing the interconnecting support ribs that connect the inner and outer walls of the retaining wall in a routing operation as described above. The resultant groove is bounded on a first side by the inner walls 12a, 14a, is bounded on a second side by the outer walls 12b, 14b, and is bounded on a third side by one of the plurality of support ribs 12c, 14c. A portion of the respective support ribs 12c, 14c extending from both inner walls 12a, 14a and outer walls 12b, 14b remains after the routing operation, due to the notch in the routing bit. Because of the helical manner in which the pipe is formed coupled with the straight cuts that form the end walls, the cut that forms each end wall cuts across one or more of the support ribs. It is therefore probable that the entrance locking lip 12d, 14d will extend about only part of the circumference of the grooves 16, 18. The height of the entrance lip 12d, 14d may vary about the circumference of the groove, however it is preferably high enough to lock the coupling member to the pipe section at a minimum of three points around the groove circumference. These three points are preferably equally spaced about the circumference of the groove. It will be understood, however, that the locking entrance lip need only be high enough and extend about enough of the pipes circumference to solve the previously mentioned problems with the prior art methods.

An example of a coupling member 20 which can join pipe sections 12, 14 according to the present invention is set forth in FIGS. 3 and 4. As illustrated therein, coupling member 20 generally includes a rigid core 22 which has the shape of an annular ring or tube section. Member 20 is preferably formed from a relatively rigid plastic such as a rigid propylene polyester or the like which can be filled with suitable strengthening fibers if desired. Preferably, core 22 is of an axial length substantially equal to or greater than the total combined axial length of the end wall grooves 16 and 18. The total cross-axial thickness of the ring is less than the cross-axial width of the grooves 16 and 18, at both the location where the entrance lip is formed, and within the groove chamber 12g, 14g.

The rigid core 22 serves to transmit substantial axial compressive forces between the sections of pipe as required during sewer relining operations. To assure that the insertion forces applied are transmitted through the core 22, the total axial length of coupling 20 is at least slightly greater than the combined axial length of grooves 16, 18.

Coupling member 20 also preferably includes covers 28a, 28b. Covers 28a, 28b are preferably a resilient compressible gasket formed from a suitable plastic or rubber, such as a neoprene, to provide the locking and sealing attributes of joint 10. FIG. 4 illustrates covers 28a, 28b in cross-sectional view, and as seen therein, each cover includes end portions 30. The end portions 30 are preferably identical and each includes a tapered and rounded end nose 32 and opposed protrusions shown in the form of angled teeth or tab elements 34. Covers 28a, 28b are positioned about the ends of the rigid core ring 22. Protrusions 34 deflect when coupling member 20 is inserted in the grooves 16, 18, thus forming a seal between the protrusions and the first and second sides of the grooves.

The combined thickness of member 20, including the thickness of both the core ring 22 and the cover 28a, 28b is greater than the width of the openings of the grooves 16, 18 formed by the locking entrance lip.

To form the joint 10, the first pipe section 12 and the coupling member 20 are brought into axial alignment. Then, a sufficient driving force is applied to the coupling member 20 in order to drive it into the groove chamber 12g, as described above. The coupling member 20 is driven into the groove such that the flexible protrusions 34 extend beyond the locking entrance lip 12d as shown in FIG. 2. The flexible protrusions 34 are mechanically locked behind locking entrance lip 12d so as to prevent decoupling of the first pipe section 12 from the coupling member 20. The second pipe section 14 is then brought into axial alignment with the exposed end of the coupling member that was not received into the first pipe section 12. The second pipe section 14 is then driven onto the exposed end of the coupling member 20 with a sufficient force such that the coupling member 20 is received in the groove chamber 14g of the second pipe section, and the flexible protrusions 34 on the exposed end of the coupling member 20 extend beyond the locking entrance lip 14d as shown in FIG. 2. The flexible protrusions 34 thus are mechanically locked behind the back portion of the locking entrance lip 14d so as to prevent decoupling of the second pipe section 14 from the coupling member 20. As a result of these steps, the coupling member 20 will be locked to pipe sections 12, 14, and the core ring 22 will be compressed against the flexible covers 28a, 28b, resulting in a fluid tight seal. Thus a locked, sealed joint is formed, which can withstand high axial and lateral loads, which is smooth on both the interior and exterior surfaces of the connected pipes, and which is easy to assemble by simply pressing the sections of pipe onto the coupling member.

The preferred dimensions of a pipe section 12, 14 according to the present invention are as follows. These preferred dimensions are for a 48" diameter pipe. For pipes of other diameters, different preferred dimensions will apply. The length of the pipe section 12, 14 is preferably 15'. The thickness of the retaining wall 12e, 14e is preferably 1.535". The thickness of both the inner wall 12a, 14a and outer wall 12b, 14b of the retaining wall is preferably 0.26". The depth of the groove 12f, 14f formed in the end wall is preferably 2". The width of the groove inside of the groove chamber 12g, 14g is preferably 1.015". The width of the groove at the location of the locking entrance lip 12d, 14d is in the range of 0.88" to 0.92".

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed:

1. A sealed locking pipe joint comprising:
  (a) a first pipe section and a second pipe section, wherein each pipe section is defined by a retaining wall and at least one end wall, said retaining wall comprising an outer wall and an inner wall connected together by a plurality of support ribs;
  (b) a groove having a locking entrance lip comprising a portion of at least one of said support ribs formed in said at least one end wall of each of said pipe sections, said groove having an opening and being bounded on a first side by the outer wall of the retaining wall, and said groove being bounded on a second side by the inner wall of the retaining wall, and said groove being bounded on a third side by one of said plurality of support ribs, wherein the groove and locking entrance lip are formed by routing the end wall through the support rib to leave a portion of the support rib that comprises the locking entrance lip; and
  (d) a coupling member comprising a flexible exterior for sealing the joint, the coupling member being mounted into the groove of said at least one end wall of each of said pipe sections such that at least a portion of said flexible exterior extends into the groove beyond the locking entrance lip and in locking engagement therewith to lock the coupling member to each of said pipe sections.

2. The pipe joint according to claim 1, wherein the pipe sections are made of plastic.

3. The pipe joint according to claim 1, wherein the groove has a circumference and the locking entrance lip has a height, said height varying around the circumference of the groove such that the flexible exterior engages the locking lip in at least three locations about said circumference.

4. The pipe joint according to claim 1, wherein the coupling member further comprises a rigid core ring and the flexible exterior comprises a resilient, compressible covering over the core ring, said covering having external protrusions.

5. The pipe joint according to claim 4, wherein the core ring is formed from a fiber reinforced plastics material.

6. The pipe joint according to claim 4, wherein the resilient compressible covering over the core ring terminates in a tapered nose portion.

7. The pipe joint according to claim 1, wherein the coupling member further comprises a rigid core ring and the flexible exterior comprises two resilient, compressible covers for covering each end of the core ring, said covers having external protrusions.

8. The pipe joint according to claim 1, wherein the outer wall, inner wall, and support ribs are all made of the same material.

9. The pipe joint according to claim 8, wherein the material is plastic.

10. The pipe according to claim 9, wherein the groove has a circumference and the locking entrance lip has a height, said height varying around the circumference of the groove such that the coupling member engages the locking lip in at least three locations about said circumference.

11. A pipe section that can be readily connected to other similarly constructed pipe sections, the pipe section comprising:
  (a) a retaining wall comprising an outer wall and an inner wall connected together by a plurality of support ribs;
  (b) at least one end wall;
  (c) a groove having a locking entrance lip comprising a portion of at least one of said support ribs formed in said at least one end wall for receiving a coupling member that lockingly engages said lip and thereby locks and seals the pipe sections, said groove having an opening and being bounded on a first side by the outer wall of the retaining wall, and said groove being bounded on a second side by the inner wall of the retaining wall; and said groove being bounded on a third side by one of said plurality of support ribs, wherein the groove and locking entrance lip are formed by routing the end wall through the support rib to leave a portion of the support rib that comprises the locking entrance lip.

12. A method of forming a pipe having a locking groove for engaging a coupling member, the method comprising the steps of:

(a) providing a pipe section, said pipe section being defined by a retaining wall and at least one end wall, said retaining wall comprising an outer wall and an inner wall connected together by a plurality of support ribs;

(b) routing a groove in said at least one end wall of said pipe section, said groove having an opening and being bounded on a first side by the outer wall of the retaining wall, said groove being bounded on a second side by the inner wall of the retaining wall, and said groove being bounded on a third side by one of said plurality of support ribs, wherein the routing step forms a locking entrance lip within the groove by removing part of one of said plurality of support ribs, said locking entrance lip for mechanically engaging the coupling member.

* * * * *